(12) United States Patent
Teng et al.

(10) Patent No.: US 11,330,249 B1
(45) Date of Patent: May 10, 2022

(54) THREE-DIMENSIONAL DISPLAY METHOD FOR LARGE FIELD OF VIEW AND SMALL VIEWING-ZONE INTERVAL

(71) Applicant: SUN YAT-SEN UNIVERSITY, Guangdong (CN)

(72) Inventors: Dongdong Teng, Guangdong (CN); Lilin Liu, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 10 days.

(21) Appl. No.: 17/107,964

(22) Filed: Dec. 1, 2020

(51) Int. Cl.
*H04N 13/32* (2018.01)
*H04N 13/398* (2018.01)
*H04N 13/322* (2018.01)

(52) U.S. Cl.
CPC ........... *H04N 13/32* (2018.05); *H04N 13/322* (2018.05); *H04N 13/398* (2018.05); *H04N 2213/001* (2013.01)

(58) Field of Classification Search
USPC .......................................................... 348/51
See application file for complete search history.

(56) References Cited

U.S. PATENT DOCUMENTS

| 10,652,526 | B2 * | 5/2020 | Liu ...................... H04N 13/363 |
| 2004/0184145 | A1 * | 9/2004 | Fridman ................ G02B 30/27 |
| | | | 348/E13.043 |
| 2015/0002645 | A1 * | 1/2015 | Moller ................. H04N 13/305 |
| | | | 348/56 |

\* cited by examiner

*Primary Examiner* — Mikhail Itskovich
(74) *Attorney, Agent, or Firm* — JCIPRNET

(57) ABSTRACT

The invention discloses a three-dimensional display method for large field of view and small viewing-zone interval. A display screen constructed by sub-screens with adjacent ones emitting lights of different exclusive optical characteristics is employed, and sequentially-switching aperture-arrays are placed close to a pupil of the viewer. M apertures of an aperture array correspond to the M sub-screens by a one-to-one manner in turn, to make the transmittance of each aperture to the light from the corresponding sub-screen be greater than that to the lights from the adjacent non-corresponding sub-screens by a ratio larger than 9. The corresponding apertures of a sub-screen in different aperture-arrays are arranged with an interval not larger than the diameter of the pupil. At a time-point, only one aperture-array gets open, and all aperture-arrays get open sequentially at different time-points of a time-period. At each time-point, each sub-screen presents optical information to the corresponding turned-on aperture synchronously. When the time-period is small enough, a three-dimensional display with large field of view and small viewing-zone interval gets implemented.

12 Claims, 5 Drawing Sheets dimensional display technology for large field of view and small viewing-zone interval.

BACKGROUND

The existing three-dimensional display is mainly based on stereoscopic technology. The stereoscopic technology realizes the presentation of three-dimensional depth by convergence of two eyes' view directions in space, through projecting only one corresponding image to each eye of the viewer respectively. To see the corresponding image clearly, each eye of the viewer should keep focusing on the corresponding image at a fixed depth. Thus, the binocular convergence distance and the monocular focus distance are always inconsistent for a viewer in a stereoscopic display system. However, when observing real objects naturally, two cone-shaped beams from a real object point cover the viewer's two eyes, respectively. These cone-shape beams drive the viewer's two eyes to naturally focus on the object point. In other words, when observing a real space scene under natural circumstances, the focusing distance and convergence distances of a viewer's two eyes are consistent. Therefore, the inherent inconsistency in a stereoscopic display system, which is always named as vergence-accommodation conflict, violates the physiological habits of the human. In fact, this vergence-accommodation conflict is the main cause of visual fatigue that hinders the practical applications of three dimensional display technology.

By projecting different images to different segments of the viewer's each pupil, U.S. patent application Ser. No. 15/481,467 (THREE-DIMENSIONAL DISPLAY SYSTEM BASED ON DIVISION MULTIPLEXING OF THE VIEWER'S ENTRANCE-PUPIL AND DISPLAY METHOD THEREOF) describes a light field display technology based on small viewing-zone interval (not larger than the pupil diameter of the viewer). At a displayed point, more than one passing-through beams from different images overlap into a spatial light spot so that the eye can focus on naturally, overcoming the vergence-accommodation conflict. In the above mentioned patent, the temporal multiplexing is adopted, and only one aperture is turned-on at each time-point. To obtain a large field of view, a large number of apertures are needed. So, a great number of adjacent time-points in a time-period are required for a larger field of view, which means a display screen with ultra-high frame rates is necessary for a large field of view.

SUMMARY OF THE INVENTION

In order to overcome the problem in the prior art that a great number of adjacent time-points in a time-period are required for realizing a three-dimensional display for large field of view and small viewing-zone interval, and to implement a large field of view by using a display screen of a moderate frame rate, the present invention proposes the following methods:

A three-dimensional display method for large field of view and small viewing-zone interval, wherein it comprises the following steps:

(i) dividing the display screen into M sub-screens and arranging N aperture-arrays close to a pupil of a viewer, with each aperture-array being constructed by M apertures which correspond to the M sub-screens by an one-to-one manner and the corresponding apertures of a sub-screen in different aperture-arrays being arranged with an interval between adjacent apertures which is smaller than the pupil's diameter, where $M \geq 2$, $N \geq 2$;

wherein the characteristics of the sub-screens and their corresponding apertures lie in that the sub-screens and their corresponding apertures are endowed with exclusive characteristics, which make a transmittance of a turned-on aperture to a light from the corresponding sub-screen be greater than that to lights from adjacent non-corresponding sub-screens by a ratio of larger than 9;

(ii) at a time-point, turning on only one of the N aperture-arrays, accompanied by the other aperture-arrays being turned-off, and each sub-screen presents optical message to the corresponding turned-on aperture;

(iii) at adjacent N time-points of a time-period, turning on all aperture-arrays sequentially and executing step (ii) to refresh optical message synchronously at each time-point;

(iv) Repeating step (iii).

Furthermore, a light emitted by each sub-screen has linear polarization characteristics, and polarization directions of linear polarized lights from adjacent sub-screens are mutually perpendicular;

and each turned-on aperture permits the linear polarized light from the corresponding sub-screen passing through and blocks the polarized lights from adjacent non-corresponding sub-screens.

Furthermore, lights emitted from adjacent sub-screens are left handed polarized light and right handed polarized light, respectively, and each turned-on aperture permits the polarized light from the corresponding sub-screen passing through and blocks the polarized lights from adjacent non-corresponding sub-screens.

Furthermore, lights from the display screen are guided to the N aperture-arrays through a relay optical component.

Furthermore, the relay optical component is a lens, a plane mirror, a half-transmitting half-reflecting mirror, a free-form surface optical component or a optical wave-guide which has function of imaging the display screen or/and deflecting lights from the display screen, or combinations of two or more of the lens, the plane mirror, a half-transmitting half-reflecting mirror, a free-form surface optical component and a optical wave-guide.

In order to overcome the above-mentioned problem, to meet the need that the both eyes of an observer can receive multiple views from a single display screen. The present invention further proposes the following solutions:

A three-dimensional display method for large field of view and small viewing-zone interval, it comprises the following steps:

(I) dividing the display screen into M sub-screens, and design two sets of aperture-arrays corresponding to the viewer's two pupils, respectively, with each aperture-array set comprising N aperture-arrays, where $M \geq 2, N \geq 2$;

wherein, each aperture-array is constructed by M apertures which correspond to the M sub-screens by an one-to-one manner and the corresponding apertures of a sub-screen in different aperture-arrays of a same aperture-array set are arranged with an interval between adjacent apertures which is smaller than the pupil's diameter;

wherein the characteristics of the sub-screens and their corresponding apertures lie in that the sub-screens and their corresponding apertures are endowed with exclusive characteristics, which make a transmittance of a turned-on aperture to a light from the corresponding sub-screen be greater than that to lights from adjacent non-corresponding sub-screens by a ratio of larger than 9;

(ii) at a time-point, for aperture arrays in a aperture-array set, turning on only one aperture-array accompanied by other aperture-arrays being turned-off, and each sub-screen presents optical message to the corresponding turned-on aperture;

(iii) At adjacent 2N time-points of a time-period, turning on all aperture-arrays sequentially and executing step (ii) at each time-point;

(iv) Repeating step (iii).

Furthermore, the light emitted by each sub-screen has linear polarization characteristics, and polarization directions of linear polarized lights from adjacent sub-screens are mutually perpendicular;

and each turned-on aperture permits the linear polarized light from the corresponding sub-screen passing through and blocks the linear polarized lights from adjacent non-corresponding sub-screens.

Furthermore, lights emitted by adjacent sub-screens are left handed polarized light and right handed polarized light, respectively, each turned-on aperture permits the polarized light from the corresponding sub-screen passing through and blocks the polarized lights from adjacent non-corresponding sub-screens.

Compared with the prior art, the present invention has advantages and technical effects as follows:

In the present invention, an aperture-array consisting of M apertures are turned on at a time-point, with different sub-screens being observable through different corresponding apertures of the turned-on aperture-array for a large field of view. Furthermore, multiple aperture-arrays which are turned on sequentially at different time-points of a time period are designed for presenting more than one images to a same pupil for overcoming vergence-accommodation conflict. Compared with the technology of the U.S. patent Ser. No. 15/481,467, the technology described in this patent requires a lower limit of two time-points for vergence-accommodation conflict-free three dimensional display with large field of view, which significantly reduces the requirement on frame rate of the display screen.

The details of the embodiments of the present invention are embodied in the drawings or the following descriptions. Other features, objects, and advantages of the present invention will become more apparent from the following descriptions and drawings.

BRIEF DESCRIPTION OF THE DRAWINGS

The accompanying drawings are used to help better understand the present invention and are also part of this description. The accompanying drawing drawings and descriptions illustrating the embodiments together serve to explain the principles of the present invention.

FIG. 2 shows transmission paths of lights from different sub-screens at a time-point when an aperture-array is turned on.

FIG. 3 shows the transmission paths of lights from different sub-screens at another time-point when another aperture-array is turned on.

DETAILED DESCRIPTION OF THE PREFERRED EMBODIMENT

The method of the present invention adopts a display screen 10 consisting of different sub-screens. The adjacent sub-screens are endowed with different exclusive characteristics. Multiple aperture-arrays which get turned on in a timing sequence are arranged in front of a pupil of the viewer as a aperture-array set 20. Each aperture of an aperture-array and its exclusive characteristic are designed to correspond to a sub-screen and its exclusive characteristic by a one-to-one manner. The corresponding apertures of each sub-screen in the different aperture-arrays are arranged with an interval between adjacent apertures which is smaller than the pupil's diameter. At different time-points of a time period, different aperture-arrays get turned on sequentially, with each sub-screen refreshing synchronously by optical message corresponding to the turned-on corresponding aperture. Through an aperture-array, an image with large field of view gets presented to the zone around the pupil. The arrangement of different aperture-arrays is well designed so as to ensure at least two images to be observed by the pupil. At each displayed spatial point, at least two passing-through beams from the at least two images observed by the pupil superimpose into a spatial light spot which the corresponding eye can focus on naturally, thereby overcoming the vergence-accommodation conflict.

Figure 1:
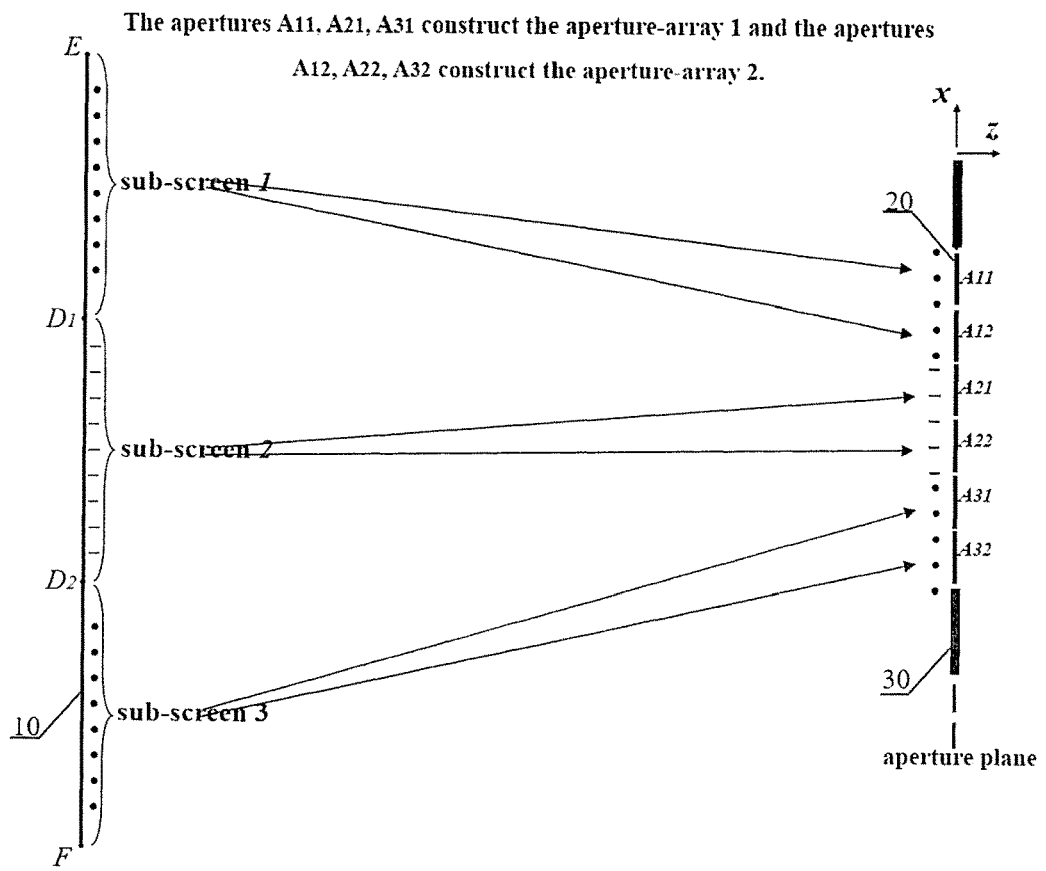
FIG. 1 shows a exclusive characteristic designing rule of sub-screens and apertures with linear polarization characteristics as example.
Figure 2:
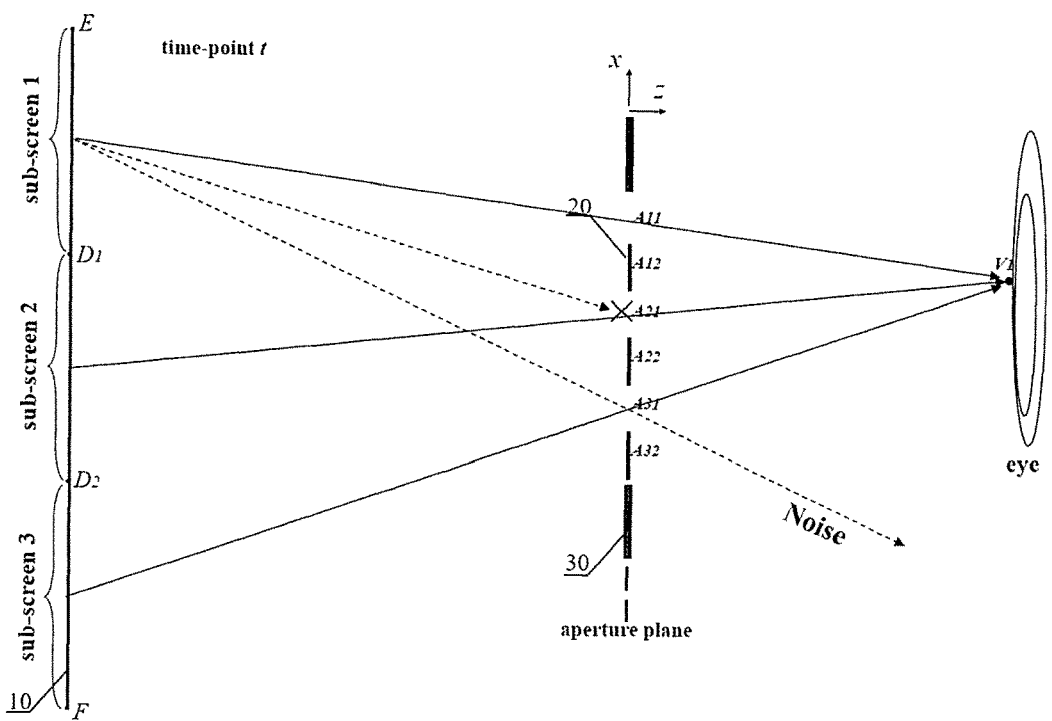
Figure 3:
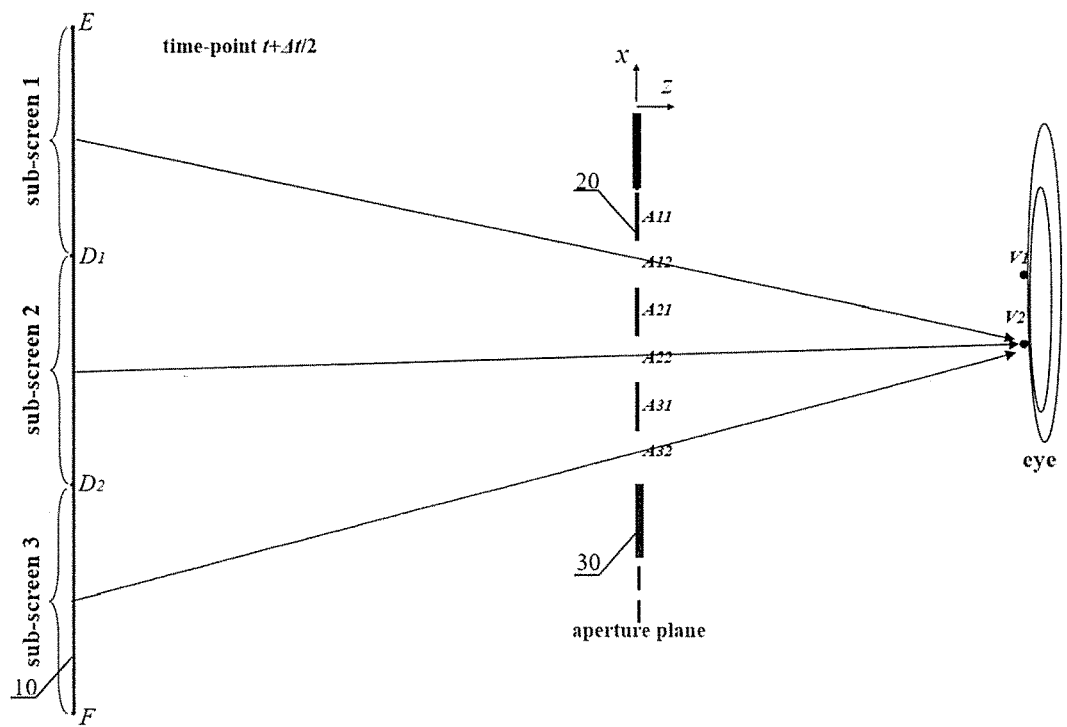

Takeing linear polarization characteristics as the exclusive characteristics, FIG. 1 illustrates the design rules of the exclusive characteristics of each sub-screen of display screen 10 and each aperture of a aperture-array set 20. Specifically, the number of sub-screens M=3 and the number of aperture-arrays N=2 are taken as the example. The light arriving at the non-aperture zone can be blocked by a blinder 30. Along the x-direction, the polarization directions of the linear polarized lights emitted by the adjacent sub-screens are mutually perpendicular "-" and "•". Specifically, the polarization direction of the linear polarized light from the sub-screen 1 is "•", the polarization direction of the linear polarized light from the sub-screen 2 is "-", and the polarization direction of the linear polarized light from the sub-screen 3 is "•". Correspondingly, the apertures Au and Au which correspond to the sub-screen 1 only permit the light with polarization direction "•" passing through under the turned-on state, the apertures $A_{21}$ and $A_{22}$ which correspond to the sub-screen 2 only permit the light with polarization direction "-" passing through under the turned-on state, and the apertures $A_{31}$ and $A_{32}$ which correspond to the sub-screen 3 only permit the light with polarization direction "•" passing through under the turned-on state. Among them, the apertures $A_{11}, A_{21}, A_{31}$ construct an aperture-array (i.e., aperture-array 1), and the apertures $A_{11}, A_{22}, A_{32}$ construct another aperture-array (i.e., aperture-array 2). The N=2 aperture arrays get turned on at a time interval $\Delta t/2$ sequentially and circularly. Specifically, at a time-point t, apertures $A_{11}$, $A_{21}$, and $A_{31}$ OF THE APERTURE-ARRAY 1 GET TURNED ON, WITH APERTURES $A_{12}$, $A_{22}$, AND $A_{32}$ OF THE APERTURE-ARRAY 2 being at the turned-off state, as shown in FIG. 2. The sub-screen 1 loads the optical image corresponding to the aperture $A_{11}$, the sub-screen 2 loads optical image corresponding to the aperture $A_{21}$, and the sub-screen 3 loads optical image corresponding to the aperture $A_{31}$. The lights from the three sub-screens are guided to a zone around the point $V_1$ in the FIG. 2. That is to say, an image from the display screen can be perceived by the pupil covering the zone around the point Vu at the time-point t. Similarly, at the time-point $t+\Delta t/2$, apertures $A_{12}$, $A_{22}$, and $A_{32}$ of the aperture-array 2 get turned on, with apertures $A_{11}$, $A_{21}$, and $A_{31}$ of the aperture-array 1 being turned off, as shown in FIG. 3. The sub-screen 1 loads the optical image corresponding to the aperture $A_{12}$, the sub-screen 2 loads optical image corresponding to the aperture $A_{22}$, and the sub-screen 3 loads optical image corresponding to the aperture $A_{32}$. The lights from the three sub-screens are guided to a zone around the point $V_2$ in the FIG. 3. That is to say, an image from the display screen can be perceived by the pupil covering the zone around the point $V_2$ at the time-point $t+\Delta t/2$. The interval between adjacent apertures from different aperture-arrays and the coverage angle of a sub-screen to the corresponding aperture are well designed so as to make the pupil covering the two zones around the point $V_1$ and point $V_2$. Thus, the pupil perceives two images in a time period. The designed interval between adjacent apertures from different aperture-arrays is smaller than the diameter of the pupil. Under this condition, at a displayed spatial point, two passing-through beams from the two images perceived by the pupil through different segments of the pupil. When the time period $\Delta t$ is small enough, based on visual retention, the two light beams superimpose into a spatial light spot that can be naturally focused on by the corresponding eye, with the vergence-accommodation conflict being overcome. Here, M is set to be 3, with a smaller N=2, i.e., two kinds of exclusive characteristics. In this case, although being blocked by the non-corresponding turned-on aperture adjacent to the corresponding turned-on aperture at a time-point, the light from a sub-screen will propagate through a non-corresponding turned-on aperture which is not adjacent to the corresponding turned-on aperture as noise. As shown in FIG. 2, at time-point t, the optical information on the sub-screen 1 which corresponds to the aperture Au propagates through the aperture $A_{31}$ as noise. Obviously, there exist 2N−1 turned-off apertures between a corresponding turned-on aperture and its nearest non-corresponding turned-on aperture which allows noise passing through, which is calculated as the number of adopted kinds of exclusive characteristics×the number of aperture-arrays −1. Reasonably designing the number of adopted kinds of exclusive characteristics, the number of aperture-arrays, and the interval between adjacent apertures, the noise can be guided to miss the pupil. At the same time, if the number of adopted kinds of exclusive characteristics is set the same as the number of sub-screens M, the aforementioned noise does not exist. In the above process, the design of the exclusive characteristics supposes that the light from a sub-screen is completely blocked by the aperture with different exclusive characteristics. Actually, an aperture with a kind of exclusive characteristics may allow light with different exclusive characteristics passing through at a low transmittance level, such as by a transmittance ratio larger than 9 for light of the corresponding exclusive characteristics compared to lights of non-corresponding exclusive characteristics.

In FIGS. 1 to 3, the apertures are one-dimension arranged along the x direction. This arrangement direction can be along the line connecting two eyes of the viewer, or its orthogonal direction, or other directions. At the same time, the spatial relationship between the display screen 10 and the aperture-array set 20 can be not limited to the parallel relationship shown in FIGS. 1 to 3. Furthermore, the apertures shown in FIGS. 1 to 3 are arranged along one-dimensional direction. They also can be arranged on a two-dimensional plane or surface. FIGS. 1 to 3 take M=3 and N=2 (i.e., two kinds of exclusive characteristics) as examples. In fact, they also can take other values. For example, the number of kinds of exclusive characteristics can be N=4 by combining colors and polarization: red light+left-handed polarization, red light+right-handed polarization, blue light+left-handed polarization, and blue light+right-handed polarization. A larger N will result in presenting more images. The eye is also not restricted to the position shown in FIG. 2 or FIG. 3. There exists a spatial zone along the z-axis for the eye, with the precondition that at least two passing-through beams for a displayed spatial point can be perceived by the pupil of the eye in this spatial zone. All apertures are set with a same size and a same interval in FIGS. 1 to 3. This is also not obligatory requirement.

In FIGS. 1 to 3, the apertures are arranged on a plane and the display screen 10 is with a planar structure. Actually, the apertures can be arranged on a curved surface, or even in the three-dimensional space. The display screen 10 can also be with a curved structure.

In FIGS. 1 to 3, the apertures are arranged seamlessly, the aperture size equals to the aperture interval. Actually, the aperture size can be smaller or larger than the aperture interval. The later means there can exist partial spatial overlapping between adjacent apertures.

The FIGS. 1 to 3 use only one pupil as example to explain how to present more than one images to a pupil. This working principle can be extended to a binocular display. For example, if another aperture-array set of N=2 aperture-arrays similar to the one shown in FIG. 1 is additionally provided to the viewer's another eye, a total of 2N=4 aperture-arrays construct an eye-glasses. At the 2N=4 time-points of a time-period $\Delta t$, the 2N=4 aperture-arrays are turned on sequentially, with each sub-screen refreshed by the corresponding optical message. Thus, a binocular display gets realized by respectively presenting two images to each eye. In the above process, two eyes of the viewer receive the corresponding images by a time-sequential method. This time-sequential method can also be replaced by endowing lights to different eyes with different exclusive characteristics. For example, pixels in the odd-numbered columns emit light with vertical linear polarization direction; pixels in the even-numbered columns emit light with horizontal linear polarization direction. Then the lights from adjacent sub-screens are endowed with other exclusive characteristics (not linear polarization characteristics). For example, M=2 sub-screens emit red light and blue light, respectively. The N=2 apertures of an aperture-array for the left eye permit lights of vertical linear polarization direction+red and vertical linear polarization direction+blue passing through. The N=2 apertures of an aperture-array for the right eye permit lights of horizontal linear polarization direction+red and horizontal linear polarization direction+blue passing through. At a time-point, one aperture-array for the right eye and one aperture-array for the left eye are turned on. In this process, pixels in all the odd-numbered columns construct an effective display screen for the left eye; pixels in all the even-numbered columns construct an effective display screen for the right eye. In existing three-dimensional cinema systems, two projectors are often used to project images with orthogonal polarization directions (such as horizontal linear polarization direction and vertical linear polarization direction) to a reflective screen or a transmissive screen capable of keeping the polarization direction of the incident light unchanged. Two polarizers, which respectively only allow light with horizontal linear polarization direction or vertical polarization linear direction passing through, are separately attached to the viewer's two eyes for presenting one corresponding image to the corresponding eye based on exclusive characteristics. At this time, the projection planes of the two projectors play the same functions to above mentioned effective display screens for the two eyes. Other kinds of exclusive characteristics are needed for adjacent aperture of an aperture-array.

Figure 4:
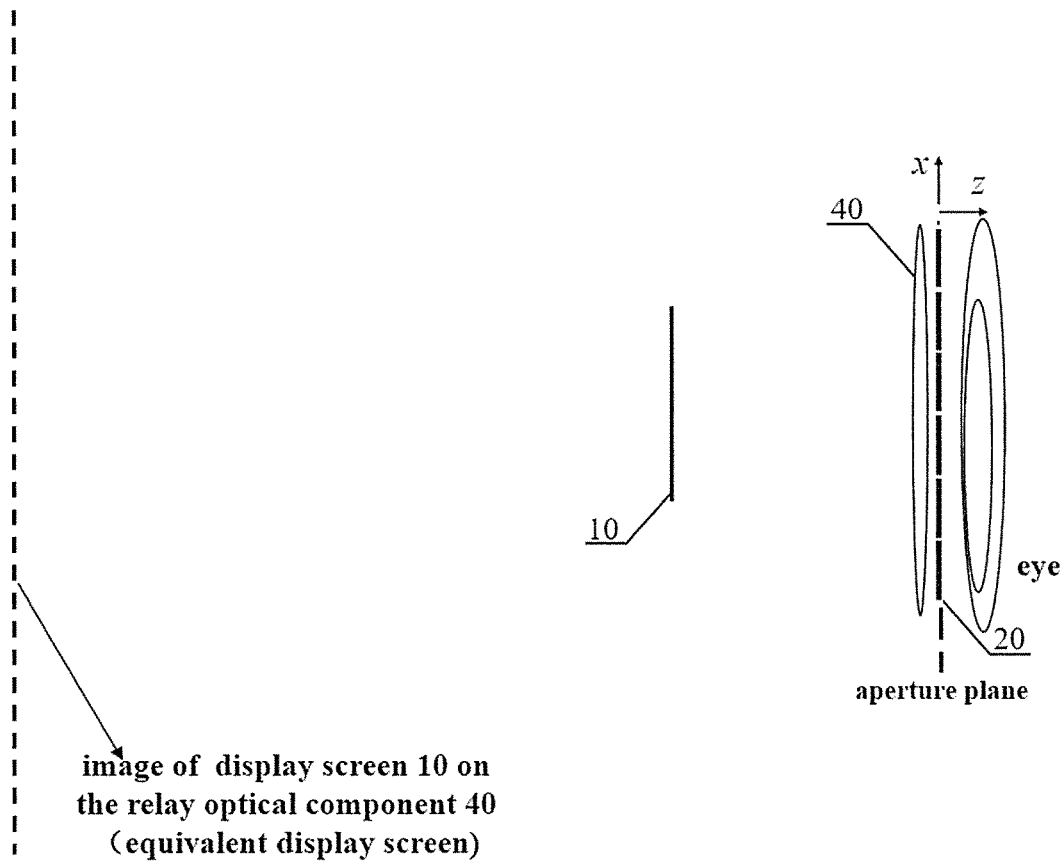
FIG. 4 shows a schematic view of a display structure using a lens having amplification imaging function as a relay optical component.
Figure 5:
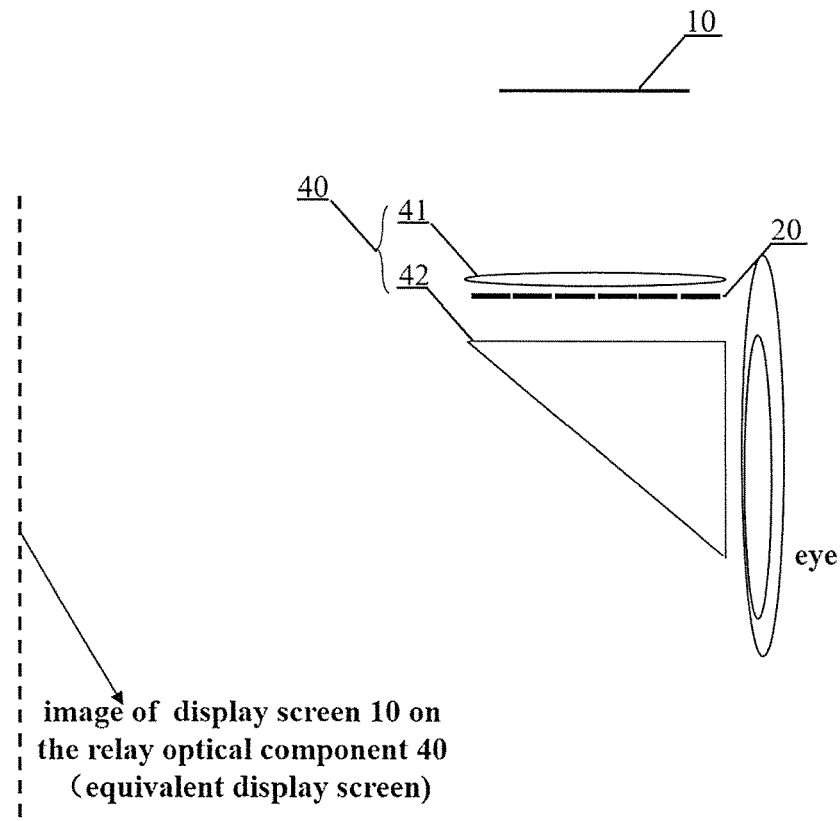
FIG. 5 shows a schematic view of a display structure using the combination of a lens with amplification imaging function and a mirror as the relay optical component.
Figure 6:
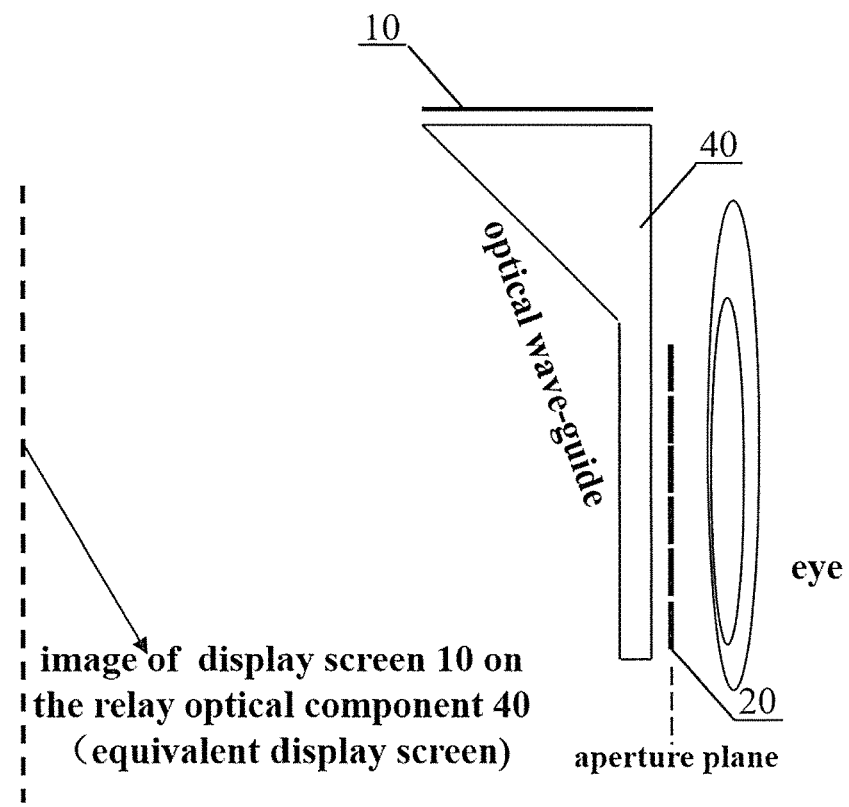
FIG. 6 shows a schematic view of a display structure using a wave-guide as the relay optical component.

The lights from the display screen 10 shown in FIGS. 1 to 3 can also be guided to the N aperture-arrays by a relay optical component 40. The image of the display screen 10 on the relay optical component 40 is used as an equivalent display screen. In FIG. 4, a lens with amplification imaging function is taken as the relay optical component 40, and this structure can be used as an eyepiece of a head-mounted virtual reality system. FIG. 5 takes a combination of a lens 41 with amplification imaging function and a mirror 42 as the relay optical component 40. When the mirror 42, such as a half-transmitting half-reflecting mirror, also allows the transmission of external ambient light, the structure can be used as an eyepiece of a head-mounted augmented reality system. The relay optical component 40 can be other optical structures with guiding functions, or with both guiding functions and amplification imaging functions. Such as an optical wave-guide relay optical component 40 shown in FIG. 6, or a free-form surface optical component which integrates the refraction, diffraction and reflection effects together. Two monocular structures shown in FIG. 5 or FIG. 6 can construct a head-mounted virtual/augmented reality system.

Figure 7:
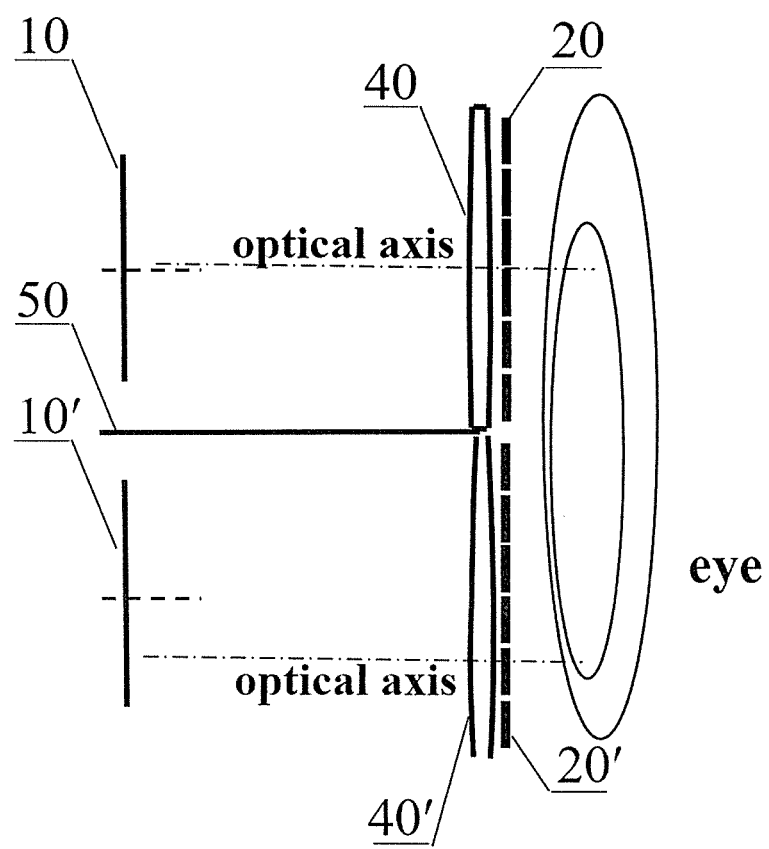
FIG. 7 shows a dual-display-screen structure.
Figure 8:
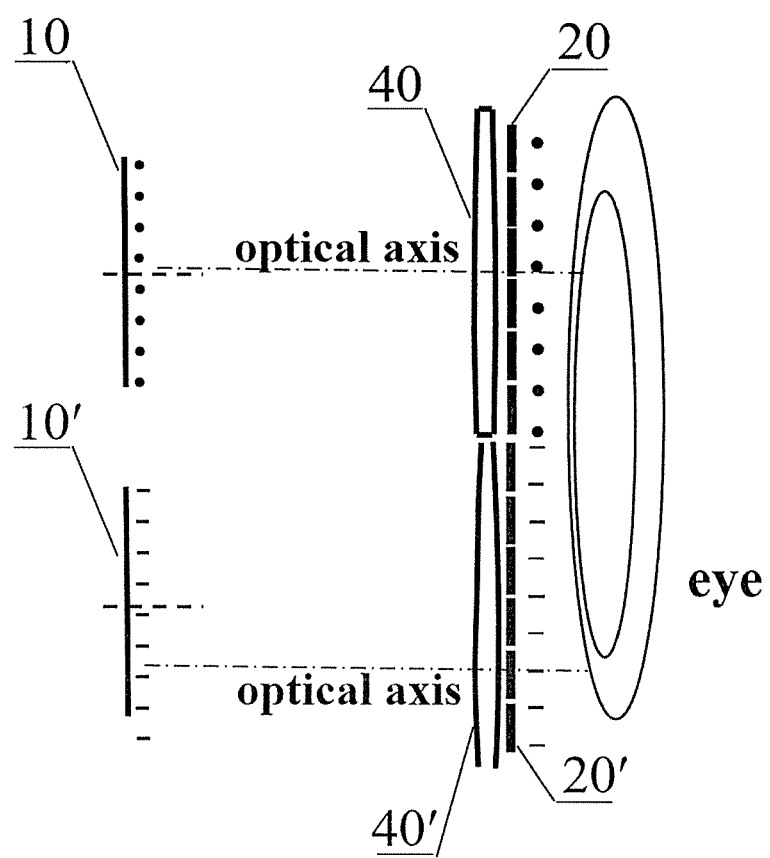
FIG. 8 shows a dual-display-screen structure in which the lights from different display screens are endowed with different exclusive characteristics.

The structure with relay optical component 40 shown in FIGS. 4-5 may also include more than one display screen. As shown in FIG. 7, display screen 10, aperture-array set 20 and lens-type relay optical component 40 form a group 10-20-40; display screen 10', aperture-array set 20' and lens-type relay optical component 40' form a group 10'-20'-40'. Each group copies the optical structure shown in FIG. 4, and they can display independently or simultaneously according to the process shown in FIGS. 1-3. To avoid optical crosstalk, a light barrier 50 is introduced in between the two groups. The equivalent display screens of two groups can be overlapped, partial overlapped, intersected, or seamlessly tiled, or separated along the depth direction. The function of the light barrier 50 can also be realized through other ways. For example, the lights emitted by the two display screens 10 and 10' are endowed with different exclusive characteristics, and an turned-on aperture of an aperture-array only permits light from a corresponding display screen passing through. For example, as shown in FIG. 8, the display screen 10 emits light with polarization direction "•", and the display screen 10' emits the light with polarization direction "-". A turned-on aperture of the aperture-array set 20 allows the light with polarization direction "•" passing through and blocks the light with polarization direction "•". A turned-on aperture of the aperture-array set 20' allows the light with polarization direction "•" passing through and blocks the light with polarization direction "•".

The methods described in this document can be applied to the applicable systems described in U.S. patent application Ser. No. 15/481,467.

The above are only preferred embodiments of the present invention, but the design concept of the present invention is not limited to this, and any insubstantial modification made to the present invention using this concept also falls within the protection scope of the present invention. For example, the exclusive characteristics used are not limited to the characteristics described above. Correspondingly, all related embodiments should fall within the scope of the following claims.

What is claimed is:

1. A three-dimensional display method for large field of view and small viewing-zone interval, characterized in that, it comprises the following steps:
   (i) dividing the display screen into M sub-screens and arranging N aperture-arrays close to a pupil of a viewer, with each aperture-array being constructed by M apertures which correspond to the M sub-screens by an one-to-one manner and the corresponding apertures of a sub-screen in different aperture-arrays being arranged with an interval between adjacent apertures which is smaller than the pupil's diameter, where M≥2, N≥2;
   wherein the characteristics of the sub-screens and their corresponding apertures lie in that the sub-screens and their corresponding apertures are endowed with exclusive characteristics, which make a transmittance of a turned-on aperture to a light from the corresponding sub-screen be greater than that to lights from adjacent non-corresponding sub-screens by a ratio of larger than 9;
   (ii) at a time-point, turning on only one of the N aperture-arrays, accompanied by the other aperture-arrays being turned-off, and each sub-screen presents optical message to the corresponding turned-on aperture;
   (iii) at adjacent N time-points of a time-period, turning on all aperture-arrays sequentially and executing step (ii) to refresh optical message synchronously at each time-point;
   (iv) Repeating step (iii).

2. The three-dimensional display method for large field of view and small viewing-zone interval according to claim 1, characterized in that, a light emitted by each sub-screen has linear polarization characteristics, and polarization directions of linear polarized lights from adjacent sub-screens are mutually perpendicular;
   and each turned-on aperture permits the linear polarized light from the corresponding sub-screen passing through and blocks the polarized lights from adjacent non-corresponding sub-screens.

3. The three-dimensional display method for large field of view and small viewing-zone interval according to claim 1, characterized in that, lights emitted from adjacent sub-screens are left handed polarized light and right handed polarized light, respectively, and each turned-on aperture permits the polarized light from the corresponding sub-screen passing through and blocks the polarized lights from adjacent non-corresponding sub-screens.

4. The three-dimensional display method for large field of view and small viewing-zone interval according to claim 1, characterized in that, lights from the display screen are guided to the N aperture-arrays through a relay optical component.

5. The three-dimensional display method for large field of view and small viewing-zone interval according to claim 4, characterized in that, the relay optical component is a lens, a plane mirror, a half-transmitting half-reflecting mirror, a free-form surface optical component or an optical wave-guide which has function of imaging the display screen or/and deflecting lights from the display screen, or combinations of two or more of the lens, the plane mirror, a half-transmitting half-reflecting mirror, a free-form surface optical component and a optical wave-guide.

6. The three-dimensional display method for large field of view and small viewing-zone interval according to claim 2, characterized in that, lights from the display screen are guided to the N aperture-arrays through a relay optical component.

7. The three-dimensional display method for large field of view and small viewing-zone interval according to claim 6, characterized in that, the relay optical component is a lens, a plane mirror, a half-transmitting half-reflecting mirror, a free-form surface optical component or an optical wave-guide which has function of imaging the display screen or/and deflecting lights from the display screen, or combinations of two or more of the lens, the plane mirror, a half-transmitting half-reflecting mirror, a free-form surface optical component and a optical wave-guide.

8. The three-dimensional display method for large field of view and small viewing-zone interval according to claim 3, characterized in that, lights from the display screen are guided to the N aperture-arrays through a relay optical component.

9. The three-dimensional display method for large field of view and small viewing-zone interval according to claim 8, characterized in that, the relay optical component is a lens, a plane mirror, a half-transmitting half-reflecting mirror, a free-form surface optical component or an optical wave-guide which has function of imaging the display screen or/and deflecting lights from the display screen, or combinations of two or more of the lens, the plane mirror, a half-transmitting half-reflecting mirror, a free-form surface optical component and a optical wave-guide.

10. A three-dimensional display method for large field of view and small viewing-zone interval, characterized in that, it comprises the following steps:
   (I) dividing the display screen into M sub-screens, and design two sets of aperture-arrays corresponding to the viewer's two pupils, respectively, with each aperture-array set comprising N aperture-arrays, where $M \geq 2$, $N \geq 2$;
   wherein, each aperture-array is constructed by M apertures which correspond to the M sub-screens by an one-to-one manner and the corresponding apertures of a sub-screen in different aperture-arrays of a same aperture-array set are arranged with an interval between adjacent apertures which is smaller than the pupil's diameter;
   wherein the characteristics of the sub-screens and their corresponding apertures lie in that the sub-screens and their corresponding apertures are endowed with exclusive characteristics, which make a transmittance of a turned-on aperture to a light from the corresponding sub-screen be greater than that to lights from adjacent non-corresponding sub-screens by a ratio of larger than 9;
   (ii) at a time-point, for aperture arrays in a aperture-array set, turning on only one aperture-array accompanied by other aperture-arrays being turned-off, and each sub-screen presents optical message to the corresponding turned-on aperture;
   (iii) At adjacent 2N time-points of a time-period, turning on all aperture-arrays sequentially and executing step (ii) at each time-point;
   (iv) Repeating step (iii).

11. The three-dimensional display method for large field of view and small viewing-zone interval according to claim 10, characterized in that, the light emitted by each sub-screen has linear polarization characteristics, and polarization directions of linear polarized lights from adjacent sub-screens are mutually perpendicular;
   and each turned-on aperture permits the linear polarized light from the corresponding sub-screen passing through and blocks the linear polarized lights from adjacent non-corresponding sub-screens.

12. The three-dimensional display method for large field of view and small viewing-zone interval according to claim 10, characterized in that, the lights emitted by adjacent sub-screens are left handed polarized light and right handed polarized light, respectively, each turned-on aperture permits the polarized light from the corresponding sub-screen passing through and blocks the polarized lights from adjacent non-corresponding sub-screens.

* * * * *